United States Patent
Arini et al.

(10) Patent No.: US 9,277,276 B1
(45) Date of Patent: Mar. 1, 2016

(54) SYSTEMS AND METHODS FOR ACTIVE TRAINING OF BROADCAST PERSONALIZATION AND AUDIENCE MEASUREMENT SYSTEMS USING A PRESENCE BAND

(71) Applicant: Google Inc., Mountain View, CA (US)

(72) Inventors: Nick Salvatore Arini, Botley (GB); Simon Michael Rowe, Berkshire, VT (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/461,660

(22) Filed: Aug. 18, 2014

(51) Int. Cl.
| | |
|---|---|
| *H04H 60/32* | (2008.01) |
| *H04N 21/442* | (2011.01) |
| *H04H 60/31* | (2008.01) |
| *H04H 60/45* | (2008.01) |
| *H04H 60/58* | (2008.01) |
| *H04N 21/41* | (2011.01) |
| *H04N 21/439* | (2011.01) |
| *H04N 21/658* | (2011.01) |

(52) U.S. Cl.
CPC ......... *H04N 21/44204* (2013.01); *H04H 60/31* (2013.01); *H04H 60/45* (2013.01); *H04H 60/58* (2013.01); *H04N 21/4126* (2013.01); *H04N 21/4394* (2013.01); *H04N 21/44218* (2013.01); *H04N 21/6582* (2013.01)

(58) Field of Classification Search
CPC .......... H04N 21/442; H04N 21/44213; H04N 21/44218; H04N 21/44222; H04N 21/466; H04N 21/4661
USPC ...................................... 725/9, 10, 11, 12, 19
See application file for complete search history.

(56) References Cited

U.S. PATENT DOCUMENTS

| | | | |
|---|---|---|---|
| 4,769,697 | A | 9/1988 | Gilley et al. |
| 8,429,266 | B2 | 4/2013 | Vanheuverzwyn |
| 8,539,527 | B2 | 9/2013 | Wright et al. |

(Continued)

FOREIGN PATENT DOCUMENTS

| | | |
|---|---|---|
| WO | WO-99/27668 | 6/1999 |
| WO | WO-2007/131069 | 11/2007 |

OTHER PUBLICATIONS

International Search Report and Written Opinion of the International Searching Authority on PCT/US2015/042780 mailed Sep. 15, 2015.

*Primary Examiner* — James R Sheleheda
(74) *Attorney, Agent, or Firm* — Foley & Lardner LLP; John D. Lanza (57) ABSTRACT

An audience measurement or personalized recommendation system may be actively trained for each panel member for a training period, during which the presence of each member is recorded while content is displayed. Panel members may carry or wear portable devices with wireless transmitters which may be detected by the measurement system. For example, each panel member may wear a wristband including a wireless transmitter broadcasting an identification code, and a measurement device may include a wireless receiver to receive broadcast identification codes and determine that the corresponding one or more panel members are present during display of content. An inference engine may create personalized profiles of each panel participant during the training period. After the training period, panel participants may stop carrying or wearing the devices, and the inference engine may determine, based on the profiles, which participants are likely present when content is being viewed.

14 Claims, 3 Drawing Sheets

(56) References Cited

U.S. PATENT DOCUMENTS

| | | |
|---|---|---|
| 8,660,307 B2 | 2/2014 | Srinivasan et al. |
| 8,677,385 B2 | 3/2014 | Fuhrer |
| 2004/0003392 A1* | 1/2004 | Trajkovic et al. ............... 725/10 |
| 2005/0144632 A1* | 6/2005 | Mears et al. .................... 725/15 |
| 2007/0157220 A1* | 7/2007 | Cordray ................. H04H 60/65 725/9 |
| 2010/0162285 A1 | 6/2010 | Cohen et al. |
| 2010/0262986 A1* | 10/2010 | Adimatyam ....... H04N 21/8405 725/9 |
| 2011/0137835 A1 | 6/2011 | Ito et al. |
| 2012/0072940 A1* | 3/2012 | Fuhrer ............................ 725/13 |
| 2012/0219156 A1 | 8/2012 | Ramaswamy et al. |
| 2012/0272259 A1* | 10/2012 | Cortes ............... G06F 17/30784 725/14 |
| 2012/0324492 A1* | 12/2012 | Treadwell, III ........ H04H 60/45 725/10 |
| 2013/0258084 A1* | 10/2013 | Deng ............... H04N 21/44218 348/77 |
| 2014/0026158 A1 | 1/2014 | Rowe et al. |
| 2014/0040929 A1 | 2/2014 | Mears et al. |
| 2014/0337868 A1* | 11/2014 | Garza ............. H04N 21/44218 725/12 |
| 2015/0121406 A1* | 4/2015 | Chai .................... H04H 60/45 725/10 |

\* cited by examiner

FIG. 1

| Event 200 |
|---|
| Event Identifier 202 |
| Event description 204 |
| Day 206 |
| Time 208 |
| Channel 210 |
| Category 212 |
| Device Identifiers 214 |

*FIG. 2A*

| Device Identifier 214 |
|---|
| Days 206' |
| Times 208' |
| Channels 210' |
| Categories 212' |
| Event Identifiers 202' |

SYSTEMS AND METHODS FOR ACTIVE TRAINING OF BROADCAST PERSONALIZATION AND AUDIENCE MEASUREMENT SYSTEMS USING A PRESENCE BAND

BACKGROUND

Audiences for content blocks, such as broadcast media or online streamed media, including commercial advertising, are typically measured via single-source data panels consisting of individuals or households recording content exposure over time. In one typical system, panel members record daily or weekly journals identifying watched content. However, if a panel member forgets that they watched an item of content, measurements may be inaccurate. Another system provides panel members with portable devices or meters that detect audio watermarks embedded in content. While an improvement on journal-based systems, such systems require panel members to continuously wear or carry the meter, as failure to do so results in missed measurements.

Other audience measurement systems may be built into smart televisions, cable demodulators, digital video recorders, or set-top boxes to record identifications of content displayed. These systems may accurately record content that has been shown, on a household basis, but may not be able to distinguish individuals within the household. Such systems may also be used for personalization, such as for recommending video-on-demand content based on previously viewed content. In demographically diverse households or households with members with different interests, this may result in poor recommendations. For example, a typical family may include one member who watches sports, another member who watches reality television programming, and still another who watches children's programming. Without the ability to distinguish between viewers, a recommendation system may suggest children's content to the sports viewer or vice versa. While some systems allow multiple user profiles, users must remember to diligently select their own profile each time they watch an item of content. Additionally, the system may not be able to distinguish between a single user and multiple users, such as a family watching a movie together, while one user is logged in. Content chosen by a group of viewers is frequently a compromise selection based on their combined interests, and may not be content that would be watched by any viewer alone. Accordingly, when the logged-in user subsequently seeks content to view alone, the system may make inaccurate recommendations.

SUMMARY

An audience measurement or personalized recommendation system may be actively trained for each user or panel member for a first period of time or training period, during which the presence of each user is recorded while content is displayed. In one implementation, panel members may carry or wear portable devices with wireless transmitters which may be detected by the measurement system. For example, each panel member may wear a wristband including a wireless transmitter, such as a Bluetooth Low Energy (BTLE) beacon broadcasting an identification code, and a device, such as a smart television or set top box, may include a wireless receiver to receive one or more broadcast identification codes and determine that the corresponding one or more panel members are present during display of content. An inference engine may create personalized profiles of each panel participant during the training period. After the training period, panel participants may stop carrying or wearing the devices, and the inference engine may determine, based on the profiles, which participants are likely present when content is being viewed. Training periods may be periodically repeated in case user preferences have changed. Additionally, preference data from participants that have recently performed a training period may be weighted more heavily than data from participants that have not recently performed a training period for demographic analysis of the overall population.

One implementation disclosed herein is a method for determining presence of individuals during audience measurement. The method includes receiving, by a first device during display an item of content, a transmitted signal from a second device associated with a first individual. The method also includes generating, by the first device responsive to receiving the transmitted signal from the second device, a first signature associated with the first individual based on the displayed item of content. The method further includes subsequently generating, by the first device during display of a second item of content, a second signature based on the displayed second item of content and the absence of the transmitted signal from the second device. The method also includes determining, by the first device, that the second signature matches the first signature. The method also includes recording, by the first device responsive to the determination, an identification of presence of the first individual during display of the second item of content.

In some implementations, the method includes receiving, by the first device during display of a third item of content, a transmitted signal from a third device associated with a second individual; and generating, by the first device responsive to receiving the transmitted signal from the third device, a third signature associated with the second individual based on the displayed third item of content. In a further implementation, the method includes determining, by the first device, that the second signature does not match the third signature. In such an implementation, recording the identification of presence of the first individual during display of the second item of content does not include recording an identification of presence of the second individual during display of the second item of content, responsive to determining that the second signature does not match the third signature.

In other implementations, the method includes receiving, by the first device during display of the first item of content, a transmitted signal from a third device associated with a second individual. In such implementations, the first signature is further associated with the second individual. In a further implementation, the method includes recording, by the first device responsive to the determination that the second signature matches the first signature, an identification of presence of the second individual during display of the second item of content.

In some implementations, the method includes determining that a difference between a parameter of the first signature and corresponding parameter of the second signature is less than a predetermined threshold. In other implementations, the method includes determining that a distance between the first signature and second signature in a multi-dimensional space is less than a predetermined threshold. In still other implementations, the method includes determining that the first signature and second signature overlap by an amount greater than a predetermined threshold. In yet still other implementations, the method includes calculating a confidence score proportional to an amount of matching between the first signature and the second signature. In such implementations, recording the identification of presence of the first individual during display of the second item of content further comprises recording the confidence score.

Another implementation disclosed herein is a system for determining presence of individuals during audience measurement. The system includes a first device comprising a processor executing an inference engine and a receiver. The receiver is configured for receiving, during display an item of content, a transmitted signal from a second device associated with a first individual. The inference engine is configured for generating, responsive to the receiver receiving the transmitted signal from the second device, a first signature associated with the first individual based on the displayed item of content. The inference engine is also configured for subsequently generating, during display of a second item of content and while the receiver is not receiving the transmitted signal from the second device, a second signature based on the displayed second item of content; determining that the second signature matches the first signature; and recording, responsive to the determination, an identification of presence of the first individual during display of the second item of content.

In some implementations of the system, the receiver is further configured for receiving, during display of a third item of content, a transmitted signal from a third device associated with a second individual; and the inference engine is further configured for generating, responsive to receiving the transmitted signal from the third device, a third signature associated with the second individual based on the displayed third item of content. In a further implementation, the inference engine is further configured for determining that the second signature does not match the third signature. In such implementations, recording the identification of presence of the first individual during display of the second item of content does not include recording an identification of presence of the second individual during display of the second item of content, responsive to determining that the second signature does not match the third signature.

In other implementations, the receiver is further configured for receiving, during display of the first item of content, a transmitted signal from a third device associated with a second individual; and wherein the first signature is further associated with the second individual. In a further implementation, the inference engine is further configured for recording, responsive to the determination that the second signature matches the first signature, an identification of presence of the second individual during display of the second item of content.

In some implementations, the inference engine is further configured for determining that a difference between a parameter of the first signature and corresponding parameter of the second signature is less than a predetermined threshold. In other implementations, the inference engine is further configured for determining that a distance between the first signature and second signature in a multi-dimensional space is less than a predetermined threshold. In still other implementations, the inference engine is further configured for determining that the first signature and second signature overlap by an amount greater than a predetermined threshold. In yet still other implementations, the inference engine is further configured for calculating a confidence score proportional to an amount of matching between the first signature and the second signature, and wherein recording the identification of presence of the first individual during display of the second item of content further comprises recording the confidence score.

Another implementation discussed herein is a computer-readable storage medium storing instructions that when executed by one or more data processors, cause the one or more data processors to perform various operations. These operations include receiving, during display an item of content, a transmitted signal from a device associated with a first individual. The operations also include generating, responsive to receiving the transmitted signal from the device, a first signature associated with the first individual based on the displayed item of content. The operations further include subsequently generating, during display of a second item of content, a second signature based on the displayed second item of content and the absence of the transmitted signal from the device. The operations also include determining that the second signature matches the first signature; and recording, responsive to the determination, an identification of presence of the first individual during display of the second item of content.

In some implementations, the instructions further cause the one or more data processors to perform operations including receiving, during display of a third item of content, a transmitted signal from a second device associated with a second individual; generating, responsive to receiving the transmitted signal from the second device, a third signature associated with the second individual based on the displayed third item of content; and determining that the second signature does not match the third signature. In such implementations, recording the identification of presence of the first individual during display of the second item of content does not include recording an identification of presence of the second individual during display of the second item of content, responsive to determining that the second signature does not match the third signature.

Also disclosed herein is an implementation of a computer-readable storage medium storing instructions that when executed by one or more data processors, cause the one or more data processors to perform operations including . . . .

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Measurement of an audience of content, such as television programming, movies, commercial advertising, or any other type and form of content, may be useful for measuring audience size or popularity of content for pricing and selling advertisement placements, planning content delivery schedules, or other such purposes. In traditional terrestrial or satellite broadcasting, a provider may not have direct knowledge of the number of receivers tuned in at any time, due to the lack of a back channel or communication pathway from the receiver to the provider. To overcome this limitation, some audience measurement systems have used panels of participating individuals who agree to fill out surveys or diaries of content they've seen or listened to. However, this system relies on self-reporting, which may have decreased accuracy. Another system requires panel participants to wear or carry a portable device that detects content played back in the vicinity via subaudible audio watermarks or codes, and records a log for subsequent transmission to the panel provider. However, this system requires watermarking encoders to be installed at every broadcast source to be measured as part of the signal chain, increasing expense and failure rates. The system also requires participants to consistently wear the devices, as non-compliance may result in missed measurements.

Wearable devices may be used to train an audience measurement or personalized recommendation system for each user or panel member for a first period of time or training period, during which the presence of each user is recorded while content is displayed. For example, each panel member may wear a wristband including a wireless transmitter, such as a Bluetooth Low Energy (BLE) beacon broadcasting an identification code, and a device, such as a smart television or set top box, may include a wireless receiver to receive one or more broadcast identification codes and determine that the corresponding one or more panel members are present during display of content. An inference engine may create personalized profiles of each panel participant during the training period. After the training period, panel participants may stop carrying or wearing the devices, and the inference engine may determine, based on the profiles, which participants are likely present when content is being viewed. Training periods may be periodically repeated in case user preferences have changed.

Figure 1:
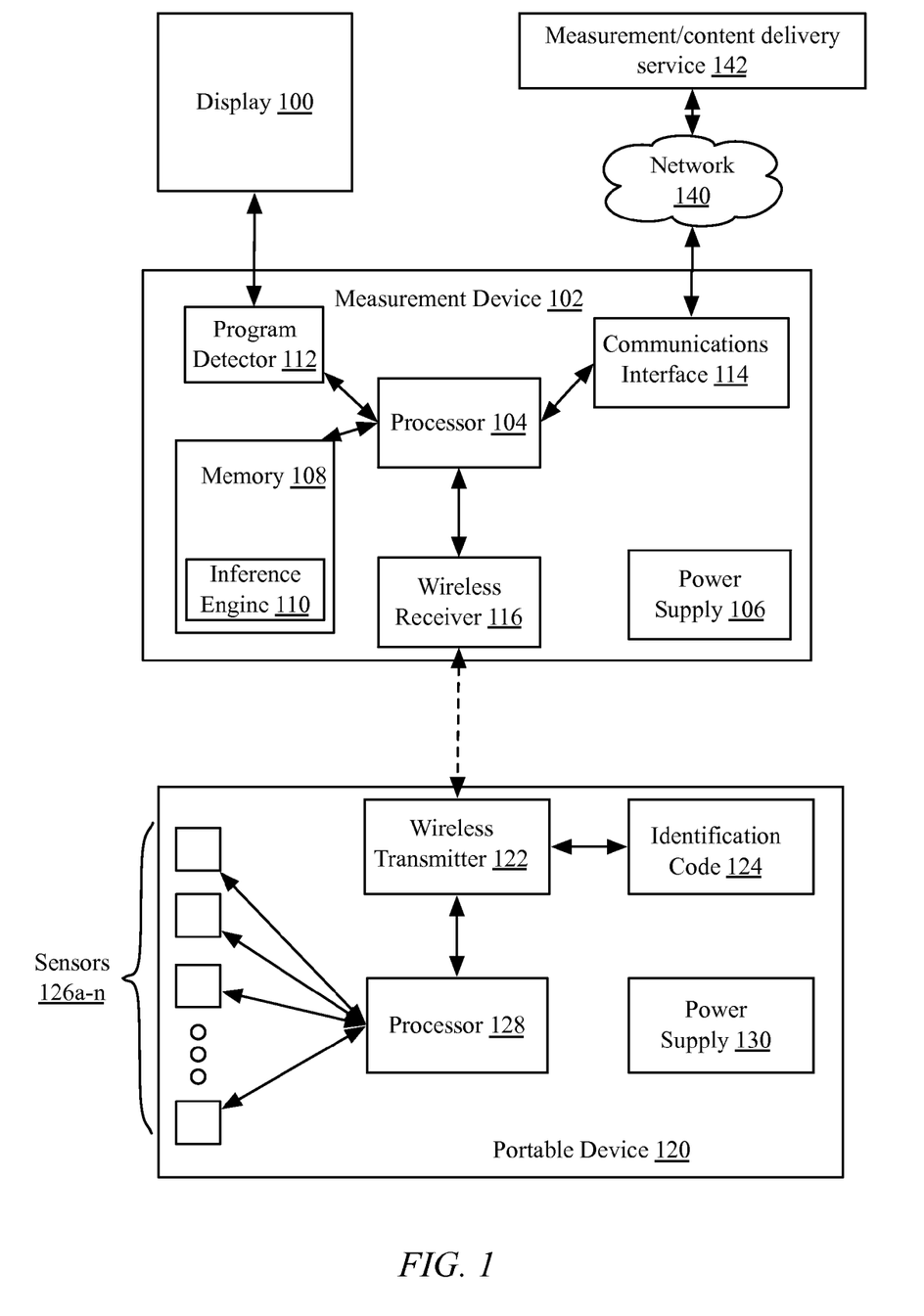
FIG. 1 is a diagram of a system for training an inference engine for audience measurement, according to one implementation.

FIG. 1 is a diagram of a system for training an inference engine for audience measurement, according to one implementation. As shown, a measurement device 102 may be connected to a display 100. Display 100 may comprise a television, monitor, projection television, or any other type of visual display. In other implementations, display 100 may comprise an audio output device, such as a radio, stereo system or other such device; accordingly, although primarily discussed in terms of visual presentations such as television shows or movies on a television screen, the systems and methods discussed herein may be readily applied to measurement and personalization of broadcast, streamed, or on-demand audio programming.

Measurement device 102 may comprise an electronic device integrated in a display 100, or external to a display 100 and in communication with the display 100 or other device receiving and providing audio, visual, or multimedia content. Measurement device 102 may comprise a set-top box, a cable demodulator or cable box, a digital video recorder, a satellite receiver, a video game console, a computing device such as a desktop, laptop, or tablet computer, or any other type and form of device configured to detect an item of audio, visual, or multimedia content shown, played, or otherwise provided via a display 100. In some implementations, a measurement device 102 may be part of the display 100 or integrated with the display 100, such as in a desktop, laptop, or tablet computer or a smart television. In other implementations, the measurement device 102 may be connected in serial or parallel to an input to the display 100. For example, in one implementation, a display 100 may comprise a television with an HDMI input, and the measurement device 102 may comprise an HDMI input and HDMI output; the measurement device 102 may accordingly be connected as an intermediary device between the output of a source, such as a cable demodulator, audio/visual receiver, satellite receiver, or other device; and the input of the television. In other implementations, the measurement device 102 and display 100 may be connected to outputs of a splitter or distribution amplifier, such that the devices 100, 102, receive the same output from a source. In still other implementations, as discussed above, the measurement device 102 may be integrated within a source, such as a set-top box.

In many implementations, a measurement device 102 may include a processor 104. Processor 104 may comprise any type and form of processing unit, including a microprocessor, application-specific integrated circuit (ASIC), FPGA, etc., or combinations of these or other processing units. In many implementations, processor 104 may be a multi-core processor or an array of processors. A measurement device 102 may also include memory 108, which may include, but is not limited to, electronic, optical, magnetic, or any other storage devices capable of providing processor 104 with program instructions. The memory 108 may include a floppy disk, CD-ROM, DVD, magnetic disk, memory chip, ROM, RAM, EEPROM, EPROM, flash memory, optical media, or any other suitable memory from which processor 104 can read instructions and, in some implementations, to which processor 104 can write measurement data for subsequent transmission via a communications interface 114. The instructions may include code from any suitable computer programming language such as, but not limited to, C, C++, C#, Java, JavaScript, Perl, HTML, XML, Python and Visual Basic.

In some implementations, a measurement device may include a power supply 106. Power supply 106 may comprise a battery, AC power supply, DC power supply, USB power supply, Power-over-Ethernet (PoE) power supply, inductive power supply, or any other type and form of power supply. Although illustrated internal to a measurement device 102, in many implementations, a power supply 106 may be external from device 102, such as an external AC-to-DC converter.

In some embodiments, memory 108 may include an inference engine 110. Inference engine 110 may comprise an application, service, server, daemon, routine, or other executable logic for generating signatures of events, such as playback of items of audio, video, or multimedia content including television programs, commercial advertising, movies, video games, music videos, or other content. Inference engine 110 may further comprise functionality for generating signatures representative of user preferences based on the identified presence of a user during an event. Inference engine 110 may further comprise functionality for comparing generated signatures to identify, in the absence of an explicit identification of presence of a user, that the user was nonetheless likely present during an event. In one implementation, each signature may comprise a point or region in a multi-dimensional graph with each dimension corresponding to a parameter (e.g. day of week, time of day, genre of content, channel, or any other such information), and the inference engine 110 may compare signatures by identifying an intersection of regions or distance between points. In one implementation, region intersection size may be compared to a threshold to determine a match, such that an intersection region above a predetermined volume represents a match between signatures. In another implementation, the distance between points may be compared to a threshold to determine a match, such that a distance of less than a predetermined threshold represents a match. In other implementations, each signature may comprise a binary string with each digit representing a parameter, and the signatures may be compared via a logical biconditional. In one such implementation, the resulting comparison string may be summed and compared to a threshold to determine a degree of matching between the signatures.

In some implementations, an inference engine 110 may maintain an audience measurement database (not illustrated). An audience measurement database may comprise any type and form of database, including a data file, flat file, relational database, structured database, etc. for storing identifications of content and/or broadcast channels and time periods and a corresponding set of device identifiers of portable devices 120 that were detected during playback of content. An inference engine 110 may count unique device identifiers associated in the database with an item of content to determine an audience measurement for the content.

Although shown on measurement device 102, in many implementations, an inference engine 110 may be executed by another device, such as at an audience measurement service or content delivery service 142. Audience measurement service or content delivery service 142, referred to generally as measurement/content delivery service 142, may comprise one or more servers, including a server farm, cloud of virtual servers executed by one or more physical servers, a software-as-a-service (SaaS) or platform-as-a-service (PaaS), or other service. In some implementations, an audience measurement service 142 may communicate with an audience panel provider to identify panelists and provide measurement results. In other implementations, the content delivery service 142 may provide personalized recommendations to audience members based on their past explicitly identified and inferred viewing habits. For example, content delivery service 142 may comprise a streaming video or video-on-demand provider, a cable provider, a satellite provider, or other service provider.

The measurement device 102 may communicate with measurement/content delivery service 142 via a network 140. Network 140 may be any form of computer network or combinations of networks that relay information between one or more measurement devices 102 and one or more measurement and/or content delivery services 142, as well as other devices not illustrated. For example, network 140 may include the Internet and/or other types of data networks, such as a local area network (LAN), a wide area network (WAN), a cellular network, satellite network, or other types of data networks. Network 140 may also include any number of computing devices (e.g., computer, servers, routers, network switches, etc.) that are configured to receive and/or transmit data within network 140. Network 140 may further include any number of hardwired and/or wireless connections. For example, a measurement device 102 may communicate wirelessly (e.g., via WiFi, cellular, radio, etc.) with a transceiver that is hardwired (e.g., via a fiber optic cable, a CAT5 cable, etc.) to other computing devices in network 140. In some implementations, a network 140 may be a virtual network, such as a virtual network between a plurality of virtual machines executed by a single physical machine, or a abstract network such as an offline transfer of data via physically movable media (e.g. a Sneakernet, transferring data via tape media, CD-ROM, flash media, external hard drives, floppy disks, etc.). For example, in one such implementation, a measurement device 140 may capture and store measurement data for subsequent transfer to a computing device via a universal serial bus (USB) or similar interface to be transmitted by said computing device via a network 140.

A communication interface 114 may comprise any type and form of network interface, including a wired interface (e.g. Ethernet, including 10 Base T, 100 Base T, or 1000 Base T ("Gigabit")), a wireless interface (e.g. 802.11a, 802.11b, 802.11g, 802.11n, 802.11.ac, Bluetooth, Bluetooth Low Energy, Near-field Communication (NFC)), a cellular interface, or any other type of interface for transmitting data over a network. In some implementations, network interface 114 may comprise a parallel or serial interface, such as a USB interface, an IEEE 1394 (Firewire) interface, an RS-232 interface, an RS-485 interface, or any other type and form of interface to another computing device. In many implementations, a second computing device may serve as an intermediary for communications to an audience measurement server. For example, in one such implementation, a capture device may communicate via a USB interface with a desktop computer, which may transmit captured closed captioning data via an Ethernet interface to a network gateway or switch connected to the Internet for transmission to an audience measurement server. In some implementations, the measurement device 102 may store data in a memory 108, for subsequent synchronization or transfer via a computing device connected to a network 140.

A measurement device 102 may, in some implementations, comprise a program detector 112. Program detector 112 may comprise hardware, software, or any combination of hardware and software for identifying content displayed on a display 100. In some implementations, program detector 112 may identify a channel selected for display on display 100 and retrieve an identification of content based on a current time and date; in other implementations, program detector 112 may simply identify the channel, time, and date and may transmit this information to a measurement service 142 for subsequent identification of content. In other implementations, program detector 112 may identify content based on metadata of the content (e.g. video-on-demand file names or content identifiers), based on closed captioning data included with the content, embedded audio watermarks in the data, radio broadcast data system (RBDS) or radio data system (RDS) data, or any other such data.

Measurement device 102 may also include a wireless receiver 116. Wireless receiver 116 may comprise an 802.11 (e.g. WiFi) transmitter and/or receiver; a Bluetooth Low Energy (BTLE) transmitter and/or receiver; a Near Field Communication (NFC) transmitter and/or receiver; a wireless universal serial bus (Wireless USB) transmitter and/or receiver; or any other type of wireless data transmitter and/or receiver. In some implementations, wireless receiver 116 may comprise an optical transmitter and/or receiver or an infrared transmitter and/or receiver. In other implementations, wireless receiver 116 may comprise an ultrasonic transmitter and/or receiver. Wireless receiver 116 may receive identification codes 124 from one or more portable devices 120 within range (e.g. within viewing or listening range of a display 100, such as within a living room). In some implementations, wireless receiver 116 may comprise a transmitter or beacon that may transmit periodic requests for portable devices 120 to transmit identification codes 124. This may be used to reduce power consumption by the portable devices 120, by allowing the device to stay in a passive, receive-only low power state until receiving a request for an identification code from the measurement device 102.

Portable device 120 may comprise any type and form of device that may be worn or carried by a panel participant. In some implementations, portable device 120 may comprise a wristband, wristwatch, ring, necklace, glasses, or other such wearable device. For example, in many implementations, a portable device 120 may be a soft wristband, made of silicone or a similar material, and including a small power supply 130, wireless transmitter 122 such as a BTLE beacon and antenna. In other implementations, portable device 120 may comprise a smart phone. Each panel participant may have a portable device 120 that may be associated with the panel participant via an identification code 124. The identification code 124 may be transmitted to measurement device 102 to identify that the portable device 120, and accordingly the panel participant, is within viewing or listening range of an item of content on display 100.

As discussed above, portable device 120 may comprise a wireless transmitter 122. Wireless transmitter 122 may comprise an 802.11 (e.g. WiFi) transmitter and/or receiver; a Bluetooth Low Energy (BTLE) transmitter and/or receiver; a Near Field Communication (NFC) transmitter and/or receiver; a wireless universal serial bus (Wireless USB) transmitter and/or receiver; or any other type of wireless data transmitter and/or receiver, corresponding to wireless receiver 116. As discussed above, although described in terms of receiver 116 and transmitter 122, in many implementations, measurement device 102 may transmit a request for an identification code 124 which may be received by portable device 120, prior to portable device 120 transmitting the code 124 to the measurement device 102. In other implementations, wireless transmitter 122 may not include a receiver, and may simply periodically transmit the identification code 124, such as once per second, once per ten seconds, once per minute, or at any other such interval. Such transmissions may be in accordance with any suitable protocol for transmission via the hardware, and may include collision avoidance, time slice negotiation, handshaking, or any other such features. In other implementations, such as where portable device 120 is a smart phone or other such device, wireless transmitter 122 may comprise a WiFi network interface or similar network interface for connecting to a network provided by measurement device 102. For example, measurement device 102 may comprise an 802.11g WiFi base station or gateway. In a further such implementation, in which such networks may have a larger range than watching or listening range for display 100 (e.g. an 802.11n WiFi network with a range covering an entire house), measurement device 102 may determine that a portable device 120 is within range based on wireless signal strength being above a threshold.

Identification code 124, sometimes referred to as a device identifier, user identifier, panel participant identifier, or by any other similar name, may comprise any type and form of identification code, set to be unique for each panel participant, either globally, within a region, or within a household. In some such implementations in which shorter codes 124 are used for household members, a household identification code may be stored by measurement device 102 and may be transmitted to a measurement/content delivery service 142 along with one or more participant identification codes 124. Accordingly, identification code 124 may comprise a binary or alphanumeric string of any suitable length, such as four bits, eight bits, sixty-four bits, or any other such value. In other implementations, identification code 124 may comprise a frequency offset of a wireless transmitter 122. For example, each panel participant in a household may have a portable device 120 broadcasting a signal at different frequencies offset from a base carrier frequency. The measurement device 102 may detect the broadcast signals and determine which panel participant(s) are present by detecting the various signal frequencies.

In some implementations, portable device 120 may comprise a processor 128, similar to any of the processors 104 discussed above. Processor 128 may comprise a powerful processor for some implementations of portable devices 120 such as a smart phone, or may be a very simple and low power processor for other implementations, such as a wearable BTLE presence band or NFC token. Processor 128 may control various functions of the portable device 120, including timing of intervals for transmission of identification codes 124, receiving and responding to requests for codes from a measurement device 102, performing negotiation or collision avoidance algorithms, etc.

In some implementations, portable device 120 may comprise one or more sensors 126a-n, referred to generally as sensor(s) 126. Sensors 126 may be used to determine that the portable device 120 is being worn or carried, as opposed to sitting on a table or otherwise unused by a panel provider. For example, sensors 126 may comprise temperature sensors to detect the warmth of the user above ambient temperature of the room, accelerometers to detect motion of the sensor to indicate that it is being worn, resistive or capacitive sensors to detect contact with the user, or any other type and form of sensor. In some implementations, sensors 126 may be used to provide data to the user, such as via a display (not illustrated). For example, a portable device 120 may include a heart rate sensor to detect that the device 120 is being worn by the user, and may also provide the heart rate to the user for exercising or fitness purposes. Such features may further encourage the user to wear the device 120 more frequently.

Portable device 120 may include a power supply 130. Power supply 130 may comprise a battery, such a Lithium-ion (Li-ion) or Nickel-Cadmium (Ni-Cad) battery or any other type and form of battery. Such batteries may be rechargeable or non-rechargeable, and may be user replaceable or non-user replaceable. In some implementations, power supply 130 may include inductive charging components, such as antennas and rectifiers, while in other implementations, power supply 130 may include a power input port, such as a micro-USB port, AC or DC plug, or any other type and form of charging port. In still other implementations, such as in very low power implementations of portable devices 120, power supply 130 may include mechanical charging systems, such as weights or springs that capture force during ordinary motion of the wearer and convert said force to electrical energy.

Figure 2A:
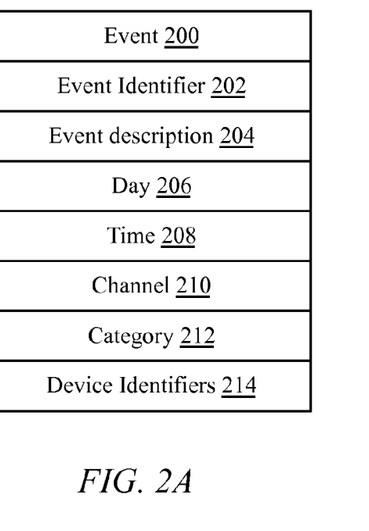
FIG. 2A is a diagram of an event record, according to one implementation.

As discussed above, a measurement device may identify one or more device identifiers or identification codes received during display of an item of content, and may generate a signature or event record. FIG. 2A is a diagram of a record for an event 200, according to one implementation. The record may comprise any type and form of record, including a set of parameter-value pairs, a set of flags or a binary string of data with predetermined bits corresponding to parameters, a data file or flat file, or any other type and form. In other implementations, the record may identify a point or region within a multi-dimensional space, as discussed above. For example, the record may have a coordinate definition according to the value of a plurality of predetermined parameters. The record may comprise a unique identifier 202 for the event, and may include a description 204 of the event, in some implementations. The record may identify a day of the week 206, and a time 208. In other implementations, the record may identify a time slot within a week, such that parameters 206-208 are combined (e.g. time slot 1 may correspond to Sunday at midnight; time slot 2 may correspond to Sunday at 12:10 AM, etc.). In such implementations, time slots may be of any length, and may be of variable lengths or of different lengths for different channels or sources. Time slots may also correspond to semantic intervals rather than explicit times such as "early evening" or "breakfast time". In some implementations, the record may identify a channel or source 210. The record may also identify a genre or category 212 for an item of content, such as commercial advertising, action movie, drama movie, reality television show, baseball game, news program, documentary, or any other such type and form of content. Such identifiers may be used for personalized recommendations of content for a participant.

Figure 3:
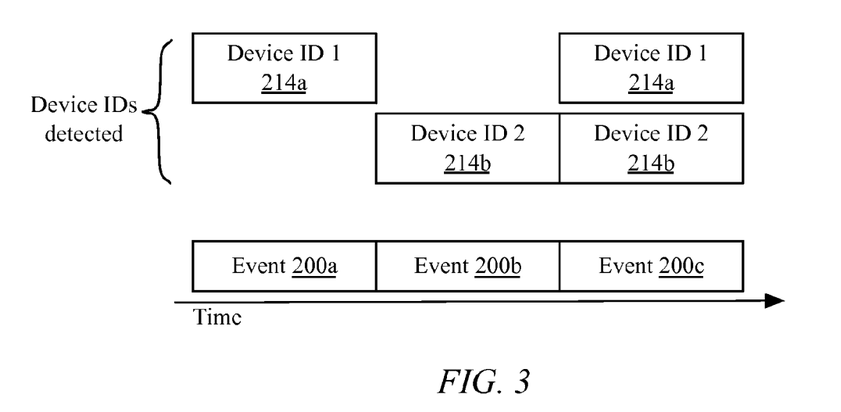
FIG. 3 is a diagram illustrating detection of devices during events, according to one implementation.

The event record may also comprise identification codes or device identifiers 214 of portable devices 120 detected during display of the item of content or event. In some implementations, device identifiers 214 may be stored separately, while in other implementations, device identifiers 214 may be concatenated or stored together. For example, in many instances, a group of panel participants may choose to watch different content than they would individually watch. By identifying such instances via the presence of multiple portable device identifiers, the measurement device may distinguish between events viewed by participant A, those viewed by participant B, those viewed by participants A and B together, those viewed by participants A and C, etc. Recommendations may be accordingly personalized based on individuals or combinations of individuals that are likely present at any time. For example, referring briefly to FIG. 3, illustrated is a diagram of detection of devices during events, according to one implementation. During a first event 200a, a measurement device may receive a first device identifier 214a from a portable device of a first panel participant. The measurement device may generate an event record identifying the device identifier 214a. Similarly, during a second event 200b, the measurement device may receive a second device identifier 214b and generate an event record identifying the second device identifier 214b. During a third event 200c, the measurement device may receive both the first and second device identifiers 214a-214b and may record them together in an event record. As the third event may be significantly different from either the first or second event, this allows for more personalized recommendations, as well as increased accuracy during inferred audience measurement.

Figure 2B:
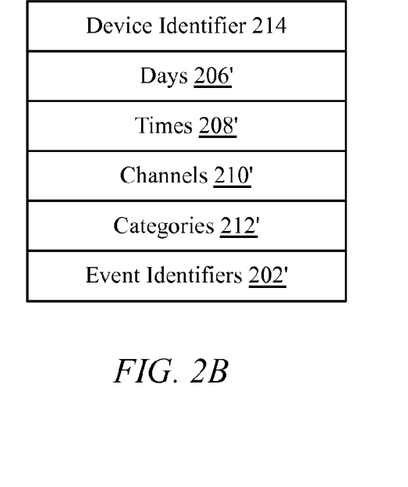
FIG. 2B is a diagram of an inference profile, according to one implementation.

FIG. 2B is a diagram of a panel participant signature or inference profile, according to one implementation. Similar to the event record of FIG. 2A, the profile may be generated by the inference engine from events displayed while the corresponding portable device or devices are present. As discussed above, separate device identifiers 214 may be stored, or device identifiers may be concatenated or stored together to create inference profiles for groups of panel participants. Each profile may include parameter-value pairs or data similar to the event records of FIG. 2A, such as days 206' and times 208' or combined timeslots as discussed above; channels 210'; and categories 212'. In some implementations, the profile may include event identifiers 202' which may correspond to individual events, as discussed above.

As discussed above, audience measurements and inference profiles may be generated based on explicitly received device identifiers during display of items of content. Once profiles have been created during a training period, panel participants may stop wearing or carrying portable devices 120. Subsequently, the measurement device may identify that an item of content is being displayed but that no broadcast device identifiers are received. The measurement device may create an event record or signature, and compare the event signature to inference profiles created during the training period. Comparisons may include logical biconditionals between two bit-strings, or point distances or intersection volume calculations within a multidimensional region, or via any other such methods. For example, an inference profile for a panel participant may comprise identifications of each day/time or timeslot that they viewed content, each genre or category of content viewed, each channel watched, etc. with parameter-value pairs representing the statistical frequency of each parameter. For example, if a panel participant watches television on 20% of Mondays and 60% of Fridays, then a week may be represented as a line with values of 0 for Sunday, 20 for Monday, 0 for Tuesday-Thursday, 60 for Friday, and 0 for Saturday (or any other corresponding proportional values). Such a line may be used as one edge of a multidimensional surface, with other edges for times, channels, categories, etc. to generate a region representative of the user's overall viewing preferences. In some implementations, values may be scaled or filtered, such as the removal of short or single-instance viewing identifications that may indicate the panel participant merely walked through a room during the display of content, or paused temporarily while changing channels to answer the phone or perform other tasks.

Figure 4:
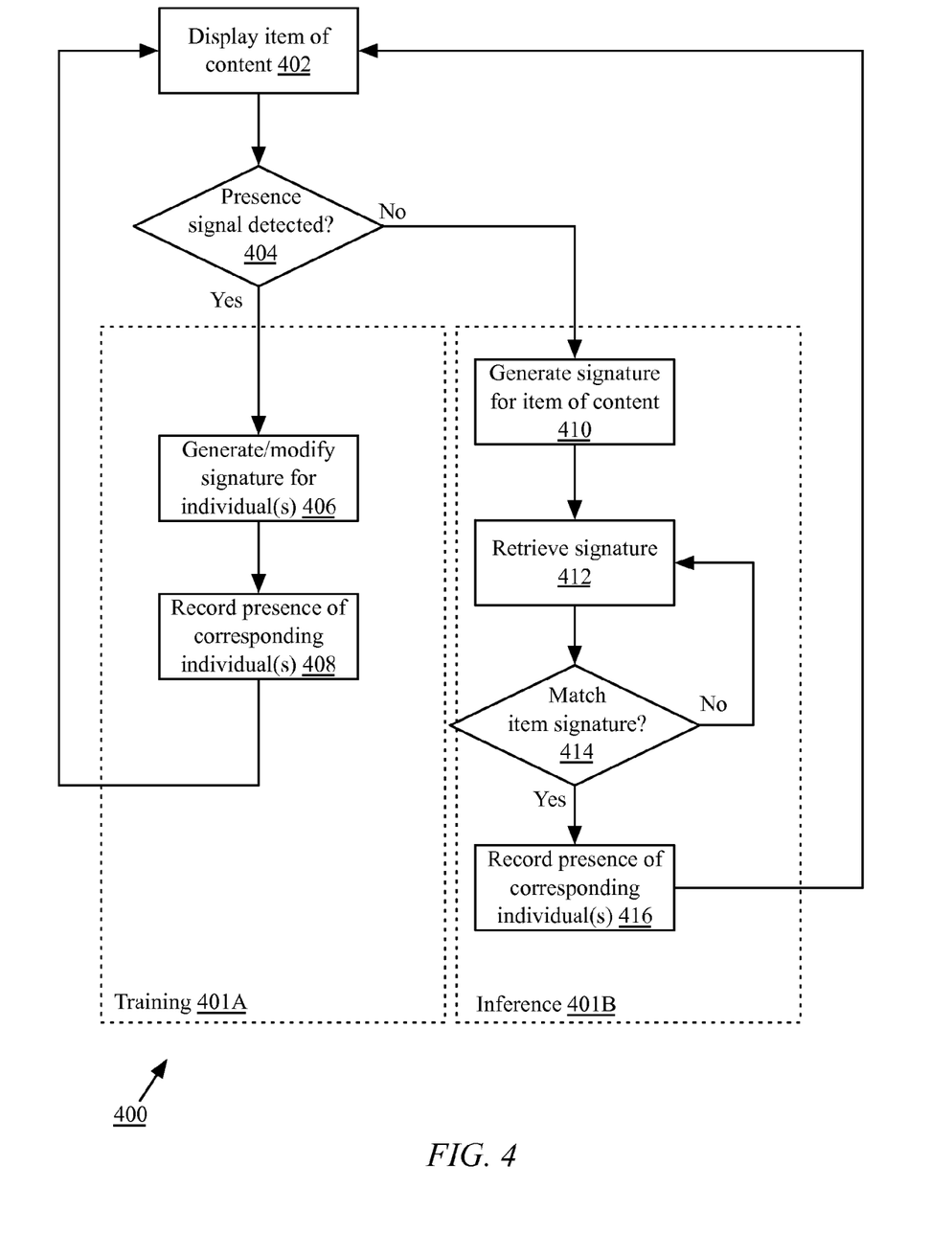
FIG. 4 is a flow diagram of the steps taken in one implementation of a process for active training and use of an inference engine for audience measurement, according to one implementation.

FIG. 4 is a flow diagram of the steps taken in one implementation of a process 400 for active training 401A and use of an inference engine 401B for audience measurement, according to one implementation. At step 402, an item of content may be displayed. As discussed above, although primarily discussed in terms of visually displayed content, the same method may be used for audio content, such as radio broadcasts or streamed music services. Accordingly, the use of "display" may interchangeably mean "played" or "provided". In many implementations, the measurement device may be integrated with the playback device providing the content, such as a set top box or smart televisions, and have direct access to information on content being displayed, while in other implementations, the measurement device may detect display of the item of content via other means as discussed above.

At step 404, the measurement device may determine whether any presence signals are detected. In some implementations, as discussed above, the measurement device may periodically transmit a request for device identifiers or identification codes of portable devices. In other implementations, the measurement device may detect periodic broadcasts of device identifiers from portable devices. In many implementations, step 404 may be repeated each time content is shown, rather than having an explicit training period. This may allow panel participants to optionally wear or not wear portable devices at will, retraining or improving the inference profiles whenever preferences have changed, in response to requests from an audience panel provider, responsive to offers for coupons or discounts or other incentives, etc. Accordingly, the determination of whether a presence signal is detected at step 404 may indicate whether the measurement device is in a training period 401A or inference period 401B.

If a device identifier is detected, then at step 406, the measurement device may generate an inference profile or signature for the individual associated with the device identifier, or modify an existing inference profile or signature. As discussed above, each signature or profile may comprise a plurality of parameter-value pairs. These values may be modified based on the displayed item of content. For example, if the displayed item of content is an action movie, then the measurement device may increase a value associated with action movies in the inference profile by a specified amount. In some implementations, such as where each event is a short portion of the item of content (e.g. a one minute or five minute period), multiple such events may occur during display of an item of content, such as a two hour movie. In some implementations, the measurement device may modify the signature once, while in other implementations, the measurement device may modify the signature by a small amount for each event. For example, in one such implementation, for each five minute period that a device identifier is present during display of an action movie, the measurement device may modify the associated signature to increase the corresponding parameter-value pair by a set amount, such as one point. Accordingly, the longer the device identifier is present during display of the content, the further the value will be increased. This may be used with filtering to remove false positives during short periods or determine individual preferences with higher granularity.

At step 408, the measurement device may record the presence of the individual associated with the device identifier. Recording the presence of the individual may comprise transmitting a record that the individual or device identifier was present to an audience measurement service or content provider, or recording the presence of the individual in an audience measurement log to be periodically provided to an audience measurement service.

In some implementations, the measurement device may determine if any additional presence signals are present or device identifiers have been received. If so, then steps 406-408 may be repeated for each additional device identifier. In other implementations, as discussed above, each combination of one or more device identifiers may be separately recorded and a separate profile generated. Accordingly, in such implementations, if a plurality of device identifiers are received at step 404 (e.g. device identifiers of portable devices associated with panel participants A, B, and C), then at step 406, a signature may be generated or modified for all associated panel participants. Such a signature may be separate from a signature for the participants individually, or for other combinations (e.g. participants A and B; participants B and C; participants A and C; participants A, B, C, and D, etc.). Similarly, at step 408, in such implementations, the measurement device may record the presence of each of the panel participants associated with the received device identifiers.

In a further implementation, signatures for individual participants may also be generated or modified at step 406 in addition to a signature for the combination of individuals that are present. In some implementations, parameter-value pairs may be modified by a lesser amount in individual profiles or signatures than in the combined value. For example, if the item of content displayed is a baseball game, a corresponding parameter-value pair in the signature for the combination of participants present (e.g. participants A, B, and C) may be increased by a high value; the corresponding parameter-value pair in the individual signature for each participant may also be increased, but by a lesser value. This may allow the creation of personalization profiles for individual participants who typically only watch content with others, but may infrequently watch content on their own. Values in such inferred individual profiles may be lower to indicate a lack of certainty or confidence in the measurements. In other implementations, an explicit confidence score may be associated with each profile. A confidence score for a profile of combined participants may be raised to a higher level than a confidence score for each profile for the individual participants, reflecting that such latter profiles are inferred rather than explicitly determined.

If no presence signal or device identifier is detected at step 404 or is received in response to a request of the measurement device, the measurement device may be in an inference period 401B. Accordingly, at step 410, the measurement device may generate a signature for the displayed item of content. At step 412, the measurement device may retrieve a signature or inference profile for a participant, and at step 414 may determine whether the signature or inference profile of the participant matches the signature for the item of content. As discussed above, determining whether the signatures match may comprise performing a logical biconditional on two parameterized bitstrings and determining whether a sum of the result is above a threshold; determining the distance between two points in a multidimensional space and determining whether the distance is below a threshold; determining whether a volume of two intersecting multidimensional regions is greater than a threshold; or any other such method. If the signatures do not match, steps 412-414 may be repeated for each other signature or inference profile. In a further implementation, steps 412-414 may be repeated for every signature or inference profile to determine a best match (e.g. highest sum of the logical biconditional; shortest distance between points; highest volume of intersecting region; etc.). As discussed above, in some implementations, separate signatures may be created for each individual participant and for combinations of participants. As preferences of individuals are likely to be similar to preferences of combinations of participants including the individual (albeit subject to compromises), then signatures of both the individual and the combination may match a signature for an item of content to some extent. By identifying the best match, the inference engine may determine whether it is more likely that the individual is present, alone, or that the combination of participants is present.

If the signatures do match, then at step 416, the measurement device may record the presence of the corresponding panel participant or participants associated with the matching signature or inference profile. As discussed above, recording the presence of the panel participant or participants may comprise transmitting a record to an audience measurement service or content provider, recording a log entry of audience members present, or other such steps. In one implementation, the measurement device may display an identification of each panel participant that is inferred to be present. Panel participants may correct any errors in the inference, and the measurement device may modify inference profiles accordingly to improve future performance. If no signatures match the generated signature at step 414, then in some implementations, the measurement device may request individuals to identify themselves, enter identification codes, or retrieve portable devices to reinitiate a training period 401A. In other implementations, the measurement device may record or indicate that it is uncertain which individuals were present, but that the item of content was displayed to the household generally. This may allow for lower confidence backup audience measurements.

As the systems and methods discussed herein utilize a measurement device 102 installed in series or parallel with a panel participant's display 100 and a portable device 120 worn or carried by each panel participant, such panel participants must typically sign up or agree to participate in data collection. As only device identifiers may be transmitted from client capture devices, privacy and anonymity of panel participants may be protected. To further enhance privacy, in some implementations, the device identifiers may be encrypted for transmission to the audience measurement server. Panel participants may also stop transmitting measurement data by removing a video input, network connection, and/or power connection from the measurement device, and may resume at any time by reattaching said connection or connections.

In some implementations, the panel participant may be provided with an opportunity to control whether or how to transmit measurement data to the audience measurement server. For example, the measurement device may be configured to be disabled during certain times of day or with certain program material (e.g. specified channels, or responsive to the presence of specified V-chip parental rating codes embedded within the video). Thus, the panel participant may have control over how information is collected about him or her and used by the audience measurement servers, panel providers, and content providers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for determining presence of individuals during audience measurement, comprising:

receiving, by a first device during display of an item of content, a transmitted signal from a second device associated with a first individual;

generating, by the first device responsive to receiving the transmitted signal from the second device, a first signature associated with the first individual based on the displayed item of content;

receiving, by the first device during display of a second item of content, a second transmitted signal from the second device and a transmitted signal from a third device associated with a second individual;

generating, by the first device responsive to receiving the transmitted signals from the second and third device, a second signature associated with both the first and second individual based on the displayed second item of content;

detecting, by the first device during display of a third item of content, no transmitted signals from the second device or third device;

generating, by the first device during display of the third item of content, a third signature based on the displayed third item of content and the absence of the transmitted signals from the second device and third device;

determining, by the first device, that the third signature matches the first signature by determining that an intersection between the third signature and the first signature is greater than an intersection between the third signature and the second signature; and recording, by the first device responsive to the determination, an identification of presence of the first individual and absence of the second individual during display of the third item of content.

2. The method of claim 1, wherein determining that the third signature matches the first signature further comprises determining that a difference between a parameter of the first signature and corresponding parameter of the third signature is less than a predetermined threshold.

3. The method of claim 1, wherein determining that the third signature matches the first signature further comprises determining that a distance between the first signature and third signature in a multi-dimensional space is less than a predetermined threshold.

4. The method of claim 1, wherein determining that the third signature matches the first signature further comprises determining that the first signature and third signature overlap by an amount greater than a predetermined threshold.

5. The method of claim 1, wherein determining that the third signature matches the first signature further comprises calculating a confidence score proportional to an amount of matching between the first signature and the third signature, and wherein recording the identification of presence of the first individual during display of the third item of content further comprises recording the confidence score.

6. The method of claim 1, further comprising:
detecting, by the first device during display of a fourth item of content, no transmitted signals from the second device or third device;
generating, by the first device during display of the fourth item of content, a fourth signature based on the displayed fourth item of content and the absence of the transmitted signals from the second device and third device;
determining, by the first device, that the fourth signature matches the second signature; and
recording, by the first device responsive to the determination, an identification of presence of both the first individual and the second individual during display of the fourth item of content.

7. A system for determining presence of individuals during audience measurement, comprising:
a first device comprising a processor executing an inference engine and a receiver;
wherein the receiver is configured for receiving, during display of a first item of content,
a transmitted signal from a second device associated with a first individual, and
receiving, during display of a second item of content, a second transmitted signal from the second device and a transmitted signal from a third device associated with a second individual; and
wherein the inference engine is configured for:
generating a first signature associated with the first individual based on the displayed first item of content and a second signature associated with both the first and second individual based on the displayed second item of content;
subsequently generating, during display of a third item of content and while the receiver is not receiving the transmitted signals from the second device or third device, a third signature based on the displayed third item of content,
determining that the third signature matches the first signature by determining that a difference between the third signature and the first signature is greater than a difference between the third signature and the second signature; and
recording, responsive to the determination, an identification of presence of the first individual and absence of the second individual during display of the third item of content.

8. The system of claim 7, wherein the inference engine is further configured for determining that a difference between a parameter of the first signature and corresponding parameter of the third signature is less than a predetermined threshold.

9. The system of claim 7, wherein the inference engine is further configured for determining that a distance between the first signature and third signature in a multi-dimensional space is less than a predetermined threshold.

10. The system of claim 7, wherein the inference engine is further configured for determining that the first signature and third signature overlap by an amount greater than a predetermined threshold.

11. The system of claim 7, wherein the inference engine is further configured for calculating a confidence score proportional to an amount of matching between the first signature and the third signature, and wherein recording the identification of presence of the first individual during display of the third item of content further comprises recording the confidence score.

12. The system of claim 7, wherein the inference engine is further configured for:
detecting, during display of a fourth item of content, no transmitted signals from the second device or third device;
generating, during display of the fourth item of content, a fourth signature based on the displayed fourth item of content and the absence of the transmitted signals from the second device and third device;
determining that the fourth signature matches the second signature; and
recording, responsive to the determination, an identification of presence of both the first individual and the second individual during display of the fourth item of content.

13. A non-transitory computer-readable storage medium storing instructions that when executed by one or more data processors, cause the one or more data processors to perform operations comprising:
receiving, during display of a first item of content, a transmitted signal from a second device associated with a first individual, and receiving, during display of a second item of content, a second transmitted signal from the second device and a transmitted signal from a third device associated with a second individual;
generating a first signature associated with the first individual based on the displayed first item of content and a second signature associated with both the first and second individual based on the displayed second item of content;
generating, during display of the third item of content, a third signature based on the displayed third item of content and the absence of the transmitted signals from the second device and third device;
determining that the third signature matches the first signature by determining that an intersection between the third signature and the first signature is greater than an intersection between the third signature and the second signature; and
recording, responsive to the determination, an identification of presence of the first individual and absence of the second individual during display of the third item of content.

14. The computer-readable storage medium of claim 13, wherein execution of the instructions further cause the one or more data processors to perform operations including:
detecting, during display of a fourth item of content, no transmitted signals from the second device or third device;
generating, during display of the fourth item of content, a fourth signature based on the displayed fourth item of content and the absence of the transmitted signals from the second device and third device;
determining that the fourth signature matches the second signature; and
recording, responsive to the determination, an identification of presence of both the first individual and the second individual during display of the fourth item of content.

* * * * *